United States Patent
Hu et al.

(10) Patent No.: US 12,481,519 B2
(45) Date of Patent: Nov. 25, 2025

(54) SELF-ADAPTIVE EVENT NOTIFICATION FREQUENCY FOR NODES IN A HYPER-CONVERGED INFRASTRUCTURE (HCI) CLUSTER

(71) Applicant: Dell Products L.P., Round Rock, TX (US)

(72) Inventors: Lixia Hu, Shanghai (CN); Joan Jun Xiong, Shanghai (CN); Tianhe Li, Shanghai (CN); Kai Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 566 days.

(21) Appl. No.: 17/955,892

(22) Filed: Sep. 29, 2022

(65) Prior Publication Data
US 2024/0095054 A1    Mar. 21, 2024

(30) Foreign Application Priority Data
Sep. 16, 2022    (CN) .......................... 202211134192.6

(51) Int. Cl.
  G06F 9/455    (2018.01)
  G06F 9/46     (2006.01)
  H04L 41/06    (2022.01)

(52) U.S. Cl.
  CPC .......... *G06F 9/45558* (2013.01); *H04L 41/06* (2013.01)

(58) Field of Classification Search
  CPC .. G06F 9/45558; G06F 9/542; G06F 2201/86; G06F 11/30; G06F 11/3072; G06F 11/3006; H04L 41/06
  See application file for complete search history.

(56) References Cited

U.S. PATENT DOCUMENTS

| | | | |
|---|---|---|---|
| 6,744,780 B1 * | 6/2004 | Gu | H04L 43/50 370/450 |
| 10,177,989 B1 * | 1/2019 | Goyal | H04L 41/147 |

(Continued)

FOREIGN PATENT DOCUMENTS

CN    109905259 A  *  6/2019

*Primary Examiner* — Mehran Kamran
*Assistant Examiner* — Zhi Chen
(74) *Attorney, Agent, or Firm* — Jackson Walker L.L.P.

(57) ABSTRACT

A disclosed event notification management method and service for use with a multi-node, hyper-converged infrastructure (HCl) cluster employs a service running on a corresponding node to monitor one or more parameters associated with event notifications sent to a cluster. The service may adjust a node's notification interval based on the monitored parameters. The parameters may include a last event notification successful (LENS) parameter indicating whether a recent notification was successful and a severity parameter determined based on an urgency type of a plurality of pending notifications within an event queue. The service may employ a first formula to decrease the notification interval following a successful previous notification and a second formula to increase the notification interval following an unsuccessful notification. The magnitude by which the notification interval is adjusted may be influenced by the severity parameter, e.g., to aggressively reduce the notification interval following successful notifications when urgency is high.

6 Claims, 3 Drawing Sheets

(56) References Cited

U.S. PATENT DOCUMENTS

| | | | |
|---|---|---|---|
| 2008/0184209 A1* | 7/2008 | LaFrance-Linden | ........................ G06F 11/3466 717/130 |
| 2010/0127881 A1* | 5/2010 | Schechter | .......... H05K 7/20836 340/584 |
| 2013/0191072 A1* | 7/2013 | Hadderman | .......... F25B 49/005 702/182 |
| 2015/0113338 A1* | 4/2015 | Maruyama | .......... G06F 11/3485 714/48 |
| 2016/0117213 A1* | 4/2016 | Arjun | ................. G06F 11/0757 714/55 |
| 2016/0259665 A1* | 9/2016 | Gaurav | ............... G06F 9/45558 |
| 2018/0373561 A1* | 12/2018 | Nassi | .................... G06F 9/5044 |
| 2019/0020711 A1* | 1/2019 | Alfieri | ................. H04L 41/5051 |
| 2020/0151024 A1* | 5/2020 | Ji | ............................ G06F 9/546 |
| 2021/0012238 A1* | 1/2021 | Gao | ..................... G06F 11/0793 |
| 2021/0143999 A1* | 5/2021 | Nirwal | .................... H04L 63/06 |
| 2021/0203731 A1* | 7/2021 | Garty | ...................... H04L 67/51 |
| 2021/0397485 A1* | 12/2021 | Sakashita | .............. G06F 9/5016 |
| 2022/0210226 A1* | 6/2022 | Nijhawan | .............. H04L 49/354 |
| 2022/0365860 A1* | 11/2022 | Silverstein | .......... G06F 11/3466 |

\* cited by examiner

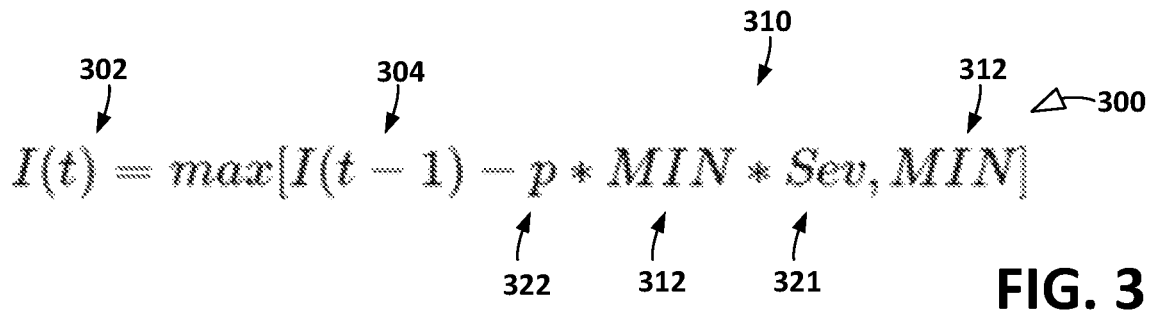
FIG. 3
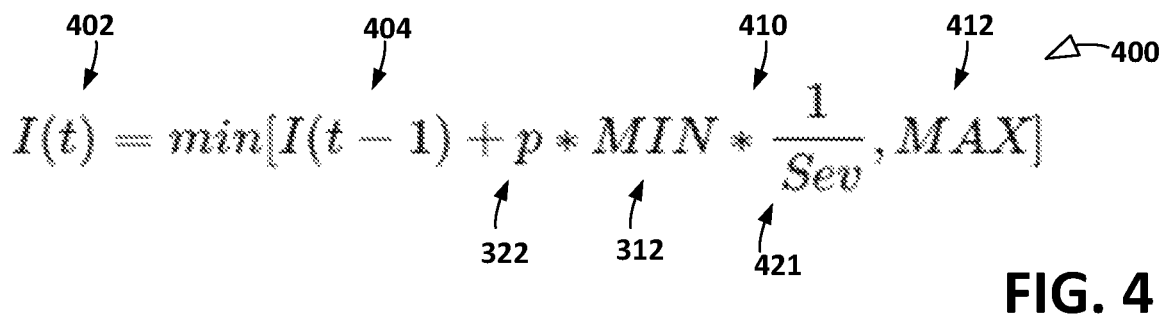
FIG. 4
$$Sev = \frac{r_1 * N_1 + r_2 * N_2 + r_3 * N_3}{N_1 + N_2 + N_3}$$
$r_i$ = weighting factor for urgency type i
$N_i$ = quantity of pending notifications of urgency type i
for example in which urgency type_1=critical, type_2=warning, and type_3=informational
$0 < r_3 < r_2 < r_1 < 1$
FIG. 5

SELF-ADAPTIVE EVENT NOTIFICATION FREQUENCY FOR NODES IN A HYPER-CONVERGED INFRASTRUCTURE (HCI) CLUSTER

TECHNICAL FIELD

The present disclosure relates to multi-node clusters of virtualized information handling systems and, more particularly, management of such clusters.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be deployed as multi-node computing clusters featuring a hyper converged infrastructure (HCI) implemented with one or more HCI appliances, each of which may correspond to one or more of the cluster nodes. An HCI platform includes virtualized compute, storage, and networking resources with centralized and automated management deployed on tightly integrated hardware node.

HCI platforms may support one or more necessary and/or desirable notifications for various hardware events to monitor the health state of each node. Ideally, each such event notification is generated, transmitted, and processed in real time. In reality, however, the HCI manager of a multi-node cluster is generally extremely busy with a variety of tasks other than the processing of event notifications. In recognition of this reality, event notifications may be scheduled to run on at a constant frequency or interval determined based on worst case scenarios for the availability of the HCI manager to process event notifications. While using a static, worst case event notification interval alleviates some concerns, doing so may undesirably impact the timeliness of the resulting notifications.

SUMMARY

In accordance with teachings disclosed herein, common problems associated with managing event notifications are addressed by methods and systems disclosed herein. In one aspect, a disclosed event notification method, which may be performed by a disclosed information handling system, includes provisioning a node of an HCl cluster with an event notification monitoring service and monitoring, with the service, one or more parameters associated with event notifications sent from the node to a manager of the cluster and adjusting a notification interval setting of the node based on the one or more parameters. The notification interval indicates when the node will next send an event notification to the manager. Accordingly, longer notification intervals correspond to less frequent notification sending and shorter notification intervals correspond to more frequent notification sending.

The event notification parameters may include a severity parameter determined based on an urgency type of each of one or more pending notifications within an event queue. In at least some embodiments, each pending notification is associated with one of N urgency types where N is a small number, e.g., less than 10. At least some embodiments may employ three urgency types, including a high urgency associated with a critical notification, a medium urgency associated with a warning notification, and a low urgency associated with an informational notification. In these embodiments, the severity parameter may be determined based on a relative quantity and weighting of high, medium, and low urgency type messages within the pending notifications. In at least one embodiment, all weightings are positive values less than 1 and the weighting for high urgency notifications (r1) is greater than the weighting for medium urgency notifications (r2), which is greater than the weighting for low urgency notifications (r3). In some such embodiments, the severity parameter may range from a low value of r3, when the pending notifications are all low urgency notifications, to r1, when the pending notifications are all high urgency notifications.

Adjusting the notification interval may include determining a notification interval delta based on a product of the severity parameter and a sensitivity coefficient. In these embodiments, adjusting the notification interval may comprise adding or subtracting the notification interval delta to the current notification interval, subject to predetermined maximum and minimum intervals.

In at least some embodiments, the event notification parameters monitored by the event notification service may include a last event notification success (LENS) parameter, which indicates a success or failure of a prior event notification. In these embodiments, adjusting the notification interval may include decreasing the notification interval, subject to the predetermined minimum interval, when the LENS parameter indicates the prior event notification was successful and increasing the notification interval, subject to the predetermined maximum interval, when the LENS parameter indicates that the prior event notification was not successful.

In at least one embodiment, decreasing the notification interval comprises adjusting the notification interval by a negative notification interval delta determined based on a product of the severity parameter, the predetermined minimum interval, and a sensitivity coefficient (p). Conversely, increasing the notification interval comprises adjusting the notification interval by a positive notification interval delta determined based on a product of a reciprocal of the severity parameter, the predetermined maximum interval, and a sensitivity coefficient, which may be the same as or different from the sensitivity coefficient used for decreasing the notification interval. By using the severity parameter for negative deltas and the reciprocal of the severity parameter for positive deltas, the notification interval decreases rapidly following successful notifications and increases slowly following unsuccessful notifications when severity is high. Conversely, when severity is low, the notification interval increases rapidly and decreases slowly. In some embodiments, the sensitivity coefficient is the same whether increasing or decreasing the notification interval. Other embodiments may use different sensitivity coefficients for increasing the interval and decreasing the interval.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an exemplary formula for adjusting the event notification interval following a successful prior notification;

FIG. 4 illustrates an exemplary formula for adjusting the event notification interval following an unsuccessful prior notification;

FIG. 5 illustrates an exemplary formula for determining a severity of an event queue comprising one or more pending event notifications.

DETAILED DESCRIPTION

Figure 1:
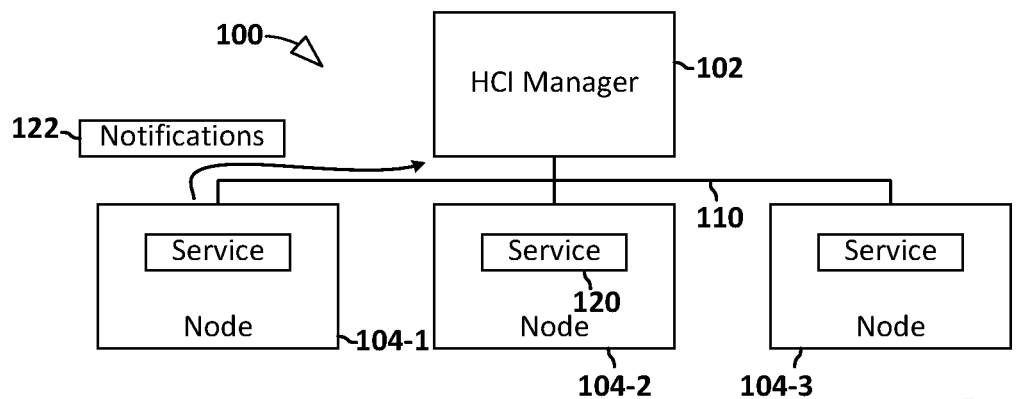
FIG. 1 illustrates an exemplary HCI cluster including one or more cluster nodes sending event notifications to a centralized HCI manager.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements. Referring now to the drawings, FIG. 1 illustrates an exemplary multi-node, HCI cluster 100 including a cluster management resource, referred to herein as HCI manager 102, and a plurality of cluster nodes 104, each coupled to HCI manager 102 by an HCI management network 110. The HCI cluster 100 illustrated in FIG. 1 supports disclosed features for implementing a node-side service 120 enabling each cluster node 104 to self-manage the node's event notification interval and thereby control the frequency with which the node sends event notifications, including the exemplary event notification 122 illustrated in FIG. 1, to the cluster manager. In at least one embodiment, cluster management network 110 supports trusted connections between HCI manager 102 and each node 104, enabling HCI manager 102 to provide centralized, remote, and automated management of cluster resources, including each of the nodes 104. In at least one embodiment, one or more of the nodes 104 is implemented in an HCI hardware device such as a VxRail appliance from Dell Technologies and, in such embodiments, HCI manager 102 may correspond to a VxRail manager.

The service may monitor one or more event notification parameters, i.e., parameters pertaining to event notifications and adjust the notification interval upwards or downwards in accordance with the monitored parameters. As a non-limiting example, the service may monitor a LENS parameter indicating the success or failure of one or more event notifications recently sent from the corresponding node to the HCI manager. The service may interpret the LENS parameter as a simplistic indication of whether the HCI manager has available notification processing capacity and adjust the notification interval accordingly, e.g., increase the notification interval and thereby slow the frequency of notifications when the LENS parameter indicates a recent failed notification and decrease the notification interval and thereby increase the frequency of notifications when the LENS parameter indicates a recent successful notification. The service may also monitor a severity parameter calculated based on an urgency associated with each of one or more notifications pending in a notification queue.

Figure 2:
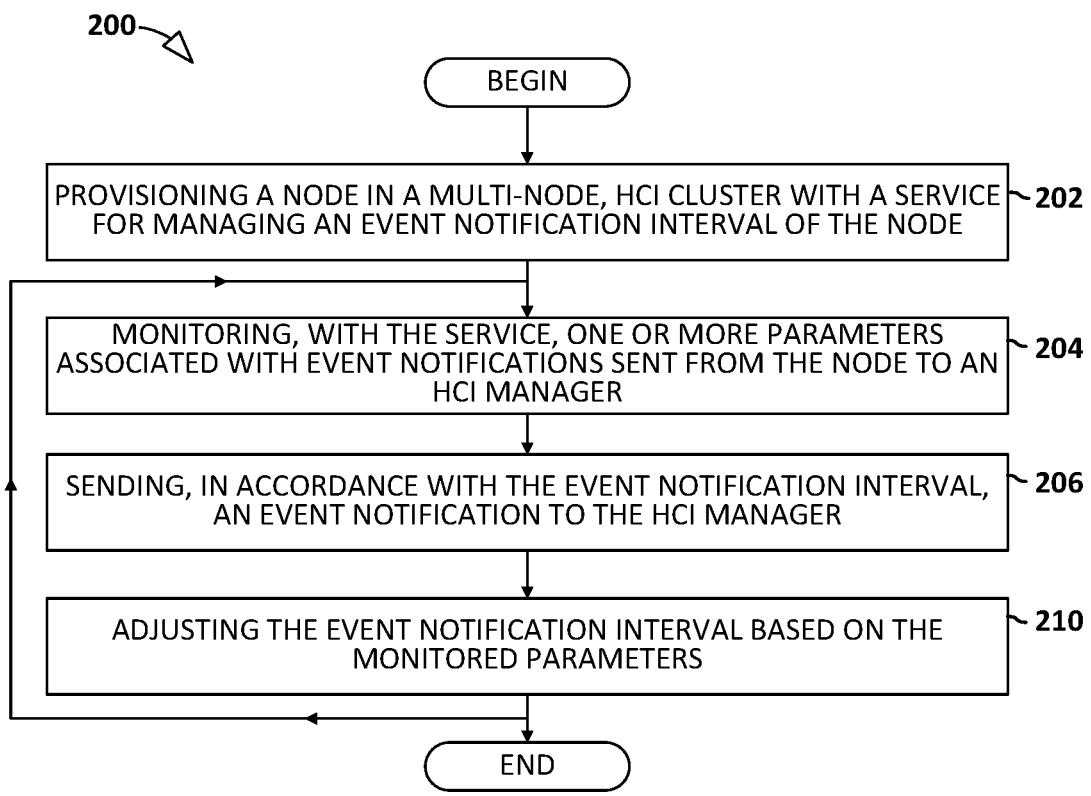
FIG. 2 illustrates a flow diagram for an exemplary method of managing event notification intervals.

Referring now to FIG. 2, a flow diagram illustrates an exemplary method 200 for node-side management of an event notification interval in accordance with disclosed teachings. As depicted in FIG. 2, the illustrated method 200 includes provisioning (step 202) a node in a multi-node, HCI cluster with a service for managing an event notification interval of the node. The illustrated method monitors (step 204), via the provisioned service, one or more parameters associated with event notifications sent from the node to a manager of the cluster. The monitored parameters may include a LENS parameter indicating success or failure of a most recent event notification and a severity parameter determined based on an urgency of pending event notifications within a notification queue. Other embodiments may monitor more, fewer, and/or different parameters pertaining to event notifications.

The method 200 illustrated in FIG. 2 includes sending (step 206), an event notification to the HCI manager in accordance with the event notification interval. Based on the one or more parameters, the illustrated method 200 adjusts (step 210) a notification interval of the node to increase or decrease an event notification frequency. In at least some embodiments, a success or fail determination is made for some or all event notifications sent to the HCI manager and a notification interval adjustment process is performed. Following successfully delivered event notifications, the notification interval adjustment process may attempt to reduce the notification interval, while following unsuccessfully delivered notifications, the adjustment process may attempt to increase the notification interval. Adjustments to the notification interval may be subject to maximum and/or minimum notification intervals. The magnitude of any adjustment in the notification interval may be influenced by a severity of an event notification queue comprising one or more pending event notifications. When severity is high, the notification interval may be reduced aggressively following a successful notification delivery. When severity is low, increases in the notification interval following an unsuccessful notification may be discounted. As depicted in FIG. 2, steps 202 through 210 may be performed repetitively such as after each sending of an event notification to the HCI manager.

Referring now to FIGS. 3, 4, and 5, formulas suitable for use in an exemplary implementation of disclosed features for node-side management of event notification intervals are depicted. The formulas illustrated in FIGS. 3, 4, and 5 are suitable for use with implementations that support the buffering of pending notification events into a notification queue that can transmitted to the HCI manager as a single message or transfer. More specifically, FIG. 3 illustrates a notification interval formula 300 invoked to determine a node's notification interval following a successfully notification, FIG. 4 illustrates a notification interval adjustment formula 400 invoked to determine the node's notification interval following an unsuccessfully delivered notification, and FIG. 5 illustrates an exemplary severity formula 500 for indicating a severity of a notification queue containing one or more pending notifications.

As depicted in FIG. 3 and FIG. 4, formulas 300 and 400 both determine the notification intervals 302, 402, denoted as I(t) to convey that the notification interval value is applicable to a current notification interval, based on the values of prior notification intervals 304, 404 for the prior notification interval, denoted as I(t−1). In at least one embodiment, the illustrated formula 300 is invoked following a successfully delivered notification to reduce, if possible, the notification interval by subtracting a notification interval delta 310 from the prior notification interval 304. In at least one embodiment, the illustrated formula 400 is invoked following a failed notification interval 402 to increase, if possible, the notification interval by adding a notification interval delta 310 to the prior notification interval 404.

In both of the notification interval formulas 300 and 400, the notification interval determined by adding or subtracting the applicable notification interval delta 310, 410 is subject to a minimum or maximum value 312, 412 respectively. In the case of formula 300, the notification interval 302 cannot be lower than the minimum notification interval 312 regardless of the previous notification interval 304 or the notification interval delta 310.

Likewise, the notification interval 402 determined by formula 400 cannot be greater than the notification interval maximum 412, regardless of the previous notification interval 404 or the notification interval delta 410. The notification interval delta 310 determined by formula 300 is the product of a severity factor 321, the minimum notification interval 312, and a sensitivity factor (p) 322. The notification interval delta 310 determined by formula 300 is the product of a reciprocal 421 of severity factor 321, the minimum notification interval 312, and the sensitivity factor (p) 322. Although FIG. 3 and FIG. 4 employ that same sensitivity factor for adjusting a sensitivity of the notification interval formulas, other embodiment may employ distinct values of sensitivity for formulas 300 and 400. In addition, although formulas 300 and 400 both determine the applicable notification interval delta 310, 410 based on the minimum notification interval 312, other embodiments may use the maximum interval value 412 or another value and, in some embodiments, formula 300 may use a different value than formula 400.

FIG. 5 illustrates an exemplary formula 500 for determining the severity parameter 321 used in formulas 300 and 400. As depicted in FIG. 5, which is shown for an example implementation in which each pending event notification on a particular node is assigned one of three urgency types, each of which is associated with a corresponding weighting factor ($r_i$). In this exemplary implementation, event notifications may be classified as critical, warning, or informational and assigned a corresponding weighting factor. In at least one embodiment, the waiting factors for each type of urgency are in the range between zero and one and the weighting factor for higher levels of urgency are greater than the waiting factors for lower levels of urgency. In the example with three urgency types, weighting factor for critical notifications is greater than the weighting factor for warning notifications, which is greater than the weighting factor for informational notifications.

As depicted in FIG. 5, the severity parameter 321 may be determined based on the waiting factors and the quantity parameters ($N_i$) indicating the number of pending notifications for each of the urgency types. In the exemplary formula 500, the severity parameter 321 may range from a low value of r3, for notification queues comprised entirely of informational notifications, to a maximum value of r1, for notifications queues comprised entirely of urgent notifications.

Figure 6:
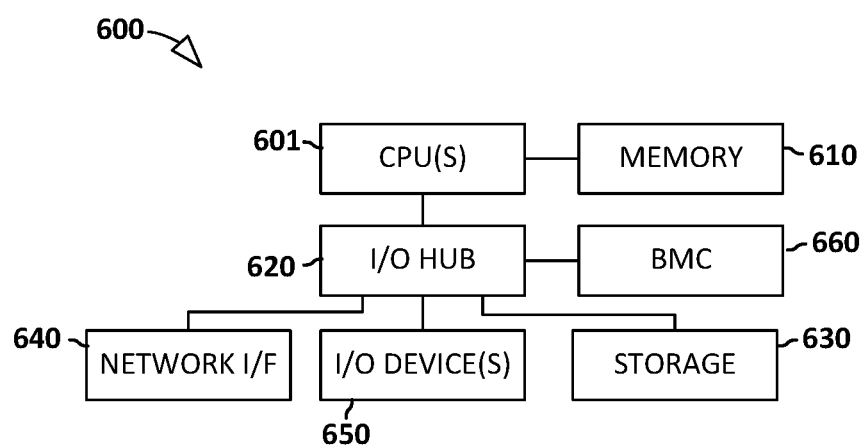
FIG. 6 illustrates an exemplary information handling system suitable for use in conjunction with features illustrated in FIG. 1-5.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An event notification method, comprising:
provisioning a hyper-converged infrastructure (HCI) appliance with a multi-node cluster comprising a plurality of nodes coupled to an HCI manager;
queuing a plurality of pending event notifications in a notification queue, wherein each pending event notification is associated with an urgency type selected from a predetermined group of urgency types;
provisioning a first node in the multi-node cluster with an event notification interval adjustment service configured to:
determine a severity factor based on the urgency types associated with the plurality of pending event notifications;
monitor a success or failure of a prior event notifications sent from the first node to the HCI manager;
maintain a last event notification success (LENS) factor based on the success or failure of the prior event notifications; and
determine an event notification interval adjustment based on the severity factor and the LENS factor;
invoking the event notification interval adjustment service to continually adjust a current notification interval of the node; and
scheduling a next event notification in accordance with the current event notification interval;
wherein adjusting the current notification interval includes decreasing the current notification interval responsive to the LENS factor indicating the prior event notification was successful and increasing the current notification interval responsive to the LENS factor indicating the prior event notification was not successful;
wherein the current notification interval is subject to a predetermined minimum interval and a predetermined maximum interval, the decreasing of the current notification interval comprises decreasing the current notification interval subject to the predetermined minimum interval, and the increasing of the current notification interval comprises increasing the current notification interval subject to the predetermined maximum interval;
wherein decreasing the current notification interval comprises decreasing the current notification interval by a first notification interval delta determined based on a product of the severity factor, the predetermined minimum interval, and a predetermined coefficient and increasing the current notification interval comprises increasing the current notification interval by a second notification interval delta determined based on a product of a reciprocal of the severity factor, the predetermined maximum interval, and the predetermined coefficient.

2. The method of claim 1, wherein the urgency type of each pending event notification is selected from: a high urgency, a medium urgency, and a low urgency.

3. The method of claim 2, wherein the severity factor is determined based on:
- a relative quantity of the high, medium, and low urgency types within the plurality of pending event notifications; and
- a weighting associated with each urgency type.

4. An information handling system, comprising:
- a central processing unit (CPU);
- a memory, accessible to the CPU, including processor executable instructions that, when executed by the CPU, cause the information handling system to perform event notification operations comprising:
  - provisioning a hyper-converged infrastructure (HCI) appliance with a multi-node cluster comprising a plurality of nodes coupled to an HCI manager;
  - queuing a plurality of pending event notifications in a notification queue, wherein each pending event notification is associated with an urgency type selected from a predetermined group of urgency types;
  - provisioning a first node in the multi-node cluster with an event notification interval adjustment service configured to:
    - determine a severity factor based on the urgency types associated with the plurality of pending event notifications;
    - monitor a success or failure of a prior event notifications sent from the first node to the HCI manager;
    - maintain a last event notification success (LENS) factor based on the success or failure of the prior event notifications; and
    - determine an event notification interval adjustment based on the severity factor and the LENS factor;
  - invoking the event notification interval adjustment service to continually adjust a current notification interval of the node; and
  - scheduling a next event notification in accordance with the current event notification interval;
  - wherein adjusting the current notification interval includes decreasing the current notification interval responsive to the LENS factor indicating the prior event notification was successful and increasing the current notification interval responsive to the LENS factor indicating the prior event notification was not successful;
  - wherein the current notification interval is subjected to a predetermined minimum interval and a predetermined maximum interval, the decreasing of the current notification interval comprises decreasing the current notification interval subject to the predetermined minimum interval, and the increasing of the current notification interval comprises increasing the current notification interval subject to the predetermined maximum interval;
  - wherein decreasing the current notification interval comprises decreasing the current notification interval by a first notification interval delta determined based on a product of the severity factor, the predetermined minimum interval, and a predetermined coefficient and increasing the current notification interval comprises increasing the current notification interval by a second notification interval delta determined based on a product of a reciprocal of the severity factor, the predetermined maximum interval, and a the predetermined coefficient.

5. The information handling system of claim 4, wherein the urgency type of a each pending event notification is selected from: a high urgency, a medium urgency, and a low urgency.

6. The information handling system of claim 5, wherein the severity factor is determined based on:
- a relative quantity of the high, medium, and low urgency types within the plurality of pending event notifications; and
- a weighting associated with each urgency type.

* * * * *